United States Patent
Noorlander et al.

(10) Patent No.: US 10,215,616 B2
(45) Date of Patent: Feb. 26, 2019

(54) COAXIAL LINEAR DRIVE-END FOR SMALL VOLUME PROVER

(71) Applicant: Honeywell International Inc., Morris Plains, NJ (US)

(72) Inventors: Hans Noorlander, Rotterdam (NL); Frank Van Bekkum, Bergschenhoek (NL)

(73) Assignee: Honeywell International Inc., Morris Plains, NJ (US)

( * ) Notice: Subject to any disclaimer, the term of this patent is extended or adjusted under 35 U.S.C. 154(b) by 204 days.

(21) Appl. No.: 15/212,422

(22) Filed: Jul. 18, 2016

(65) Prior Publication Data

US 2018/0017429 A1    Jan. 18, 2018

(51) Int. Cl.
| | |
|---|---|
| *G01F 25/00* | (2006.01) |
| *G06F 15/02* | (2006.01) |
| *G01F 3/16* | (2006.01) |
| *G01F 15/02* | (2006.01) |
| *G01F 15/075* | (2006.01) |

(52) U.S. Cl.
CPC ...... *G01F 25/0007* (2013.01); *G01F 25/0015* (2013.01); *G01F 3/16* (2013.01); *G01F 15/024* (2013.01); *G01F 15/0755* (2013.01)

(58) Field of Classification Search
CPC .................................................. G01F 25/0007
USPC ............................................................ 73/1.19
See application file for complete search history.

(56) References Cited

U.S. PATENT DOCUMENTS

| | | | | |
|---|---|---|---|---|
| RE31,432 E | * | 11/1983 | Francisco, Jr. ...... | G01F 25/0015 73/1.21 |
| 4,481,806 A | * | 11/1984 | Schad ................. | G01F 25/0015 200/61.41 |
| 7,650,775 B2 | | 1/2010 | Ignatian | |
| 8,196,446 B2 | | 6/2012 | Ignatian | |
| 8,205,479 B2 | | 6/2012 | Ignatian | |
| 8,578,752 B2 | | 11/2013 | Ignatian | |
| 2013/0104621 A1 | * | 5/2013 | Larsen ................ | G01F 25/0015 73/1.19 |

* cited by examiner

*Primary Examiner* — Walter L Lindsay, Jr.
*Assistant Examiner* — Philipmarcus T Fadul (57) ABSTRACT

A small volume prover apparatus and method for precisely measuring the displaced volume of a fluid. A precision bore cylinder and a piston can be configured with a valve arrangement in order to permit fluid to pass through an annular passage when the piston travels from one position to an opposite position. A magnetized forcer connected to the piston and a magnetic drive chamber configured to produce linear motion of said magnetized forcer are operably connected to the piston in order to move the piston from one position to the other.

18 Claims, 5 Drawing Sheets

COAXIAL LINEAR DRIVE-END FOR SMALL VOLUME PROVER

TECHNICAL FIELD

Embodiments are generally related to flow meter proving systems and, methods. Embodiments are also related to small volume provers and methods thereof. Embodiments are additionally related to accelerometer sensors. Embodiments are further related to drive end design of small volume provers.

BACKGROUND

Meter provers and flow proving components use a known traceable volume under actual operating conditions to calibrate and/or verify the performance of flow meters. A SVP (Small Volume Prover) or piston prover can be employed to accurately (e.g., 0.02% tolerance) measure displaced volume in a fluid flow process and calibrate the flow measurement device employed in a custody transfer (e.g., pipe lines, etc.) or legal metrology applications. Small volume provers generally include a precisely honed cylinder with sensors positioned at key locations for detecting the beginning and ending of a piston stroke. The volume of the stroke can then be employed to determine or verify the volume measured by the flowmeter under test.

Conventional small volume provers for calibrating a liquid flow sensor with respect to the measurement of a fixed volume typically employ a drive-end used to pull the piston back to the start position. A typical drive train can include an electric motor with a chain or belt, or can be hydraulically or pneumatically driven. This requires multiple parts to function. The inherent upstream and downstream shaft requires high pressure seals for good functionality in such designs. Additionally, these shafts increase the total size of the small volume prover (SVP). This is a serious problem in many applications because there are often rigid size constraints for proper application of the small volume prover. Furthermore, prior art methods require a number of parts that make stocking and maintenance untenable. The multitude of parts required in such prior art designs also negatively influences the reliability of the system.

Based on the foregoing, a need exists for an improved small volume prover apparatus and method for measuring flow rate. A need also exists, for an improved drive end mechanism for small volume provers to minimize the number of parts, reduce the device footprint, and minimize the number of seals as will be described in greater detail herein.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for improved meter proving systems and methods.

It is another aspect of the disclosed embodiments to provide for an improved small volume prover apparatus and method for measuring flow rate.

It is a further aspect of the disclosed embodiments to provide for an improved coaxial linear drive for Small Volume Provers.

The aforementioned aspects and other objectives and advantages can now be achieved as described herein. A small volume prover apparatus comprises: a bore cylinder having a flow inlet and a flow outlet; a piston maintained by, and housed within, the bore cylinder; a magnetized forcer connected to the valve in the piston; and an electro-magnetic drive chamber configured to produce linear motion of the magnetized forcer. The embodiments described herein largely reduce the number of critical parts necessary. This is critical for low maintenance and high reliability, while working under adverse conditions and at high velocities, particularly when combined with the high loads experienced in many applications.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The embodiments will now be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As used herein, the term "and/or" includes any and all combinations of one or more of the associated listed items.

The particular values and configurations discussed in the following non-limiting examples can be varied and are cited merely to illustrate one or more embodiments and are not intended to limit the scope thereof.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

A small volume prover (SVP) apparatus and method for providing variable volume calibration is disclosed herein. The apparatus generally includes a precision bore cylinder and a piston configured with a valve arrangement in order to permit fluid to pass through an annular passage when the piston is traveling from one position to an opposite position. Detectors are used to provide calibration of flexible volumes as fluid travels through the flow tube at the same velocity as the piston. An electromagnetic drive controls the retraction of the piston assembly after the calibrated volume stroke.

The operation of a small volume prover has been described in U.S. Pat. No. 8,826,717, titled "Small Volume Prover Apparatus and Method for Providing Variable Volume Calibration" which share the assignee with the present application. U.S. Pat. No. 8,826,717 is herein incorporated by reference in its entirety.

Figure 5:
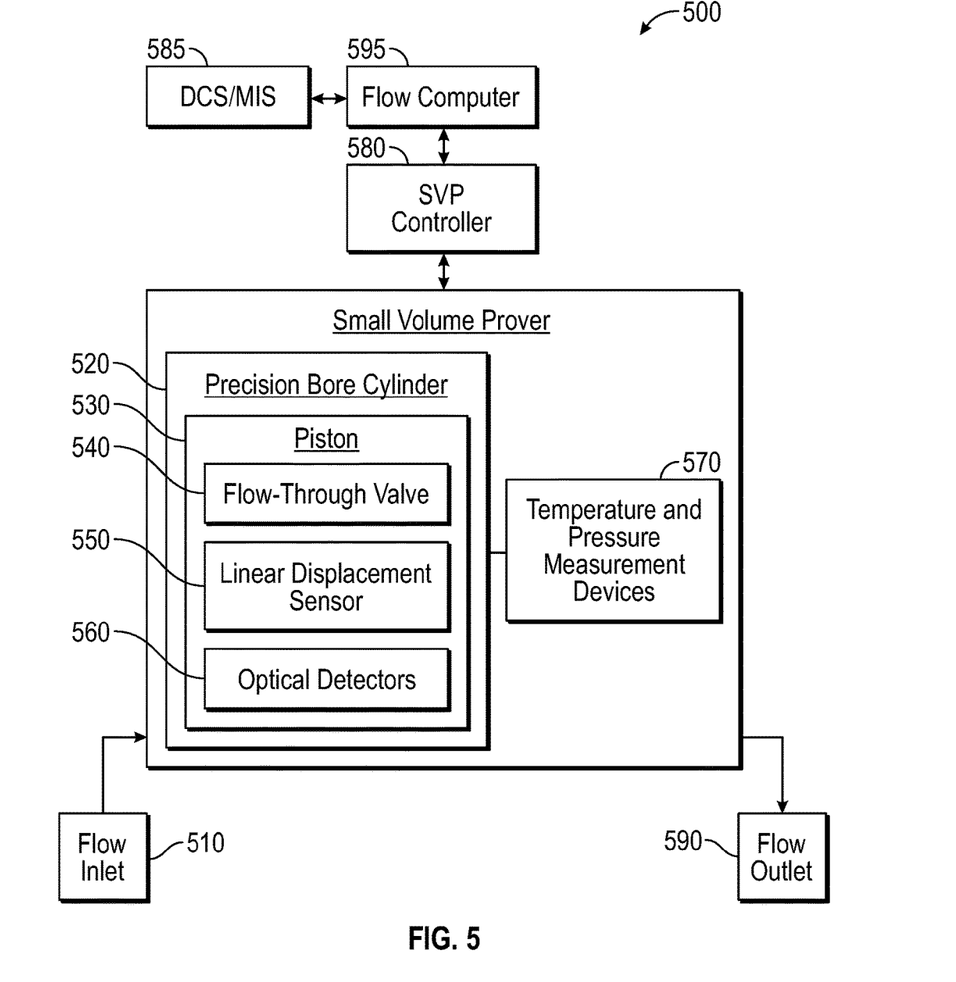
FIG. 5 illustrates a block diagram of a small volume prover apparatus, in accordance with the disclosed embodiments.

FIG. 5 illustrates a block diagram of a small volume prover apparatus 500, in accordance with the disclosed embodiments. The small volume prover apparatus 500 provides equal upstream and downstream displaced volumes The apparatus 500 provides a temperature and pressure measurement means with low uncertainty for calculation of the base displaced volume; that is, the volume at reference conditions. The apparatus 500, and more specifically the temperature and pressure measurement device 570, can employ an electronic pulse-counting technique such as, for example, a double chronometry for calibrating the flowmeter under test, against displaced volume of a fluid.

The apparatus 500 includes a precision bore cylinder 520 having a flow inlet 510 and a flow outlet 590. The precision bore cylinder 520 houses a piston 530 configured with a flow-through valve 540 in order to permit fluid to pass through the piston when open. Fluid flows through the annular passage only when the piston is retracted to the starting position. When the flow-through valve 540 is closed, the piston is pushed along an annular passage by the flow of fluid from one position to an opposite position. A position sensor 550 and a pair of detectors 560 can be operably connected to the piston 530 continuously sensing an accurate position and stroke of the piston 530. In an embodiment, the pair of detectors 560 may be magnetic detectors, laser detectors, infrared detectors, or other such detectors.

Note that the position sensor 550 can include, for example, a linear displacement sensor such as a magnetostriction linear/velocity position sensor. In an embodiment, the coil/magnetic drive can, in the calibration displacement, also act as the sensor for position for velocity and as a shock absorber. The position sensor 550 can also be implemented in some embodiments as rotational-type device rather than a linear position type mechanism. The position sensor 550 assists generally in measuring the position of the piston 530. Note that one of the advantages of linear piston measurement is that it is possible to continuously monitor the movement of the piston. During the measurement stroke, it is then representative for the flow and during the retrieval it can provide information with respect to the drive system.

The apparatus 500 further can contain multiple temperature and pressure measurement devices 570, which are utilized for correction of the measured quantity. That is, temperature is utilized to correct for the thermal expansion of the cylinder bore 520 with sensors and also for the thermal expansion of the liquid. Pressure is utilized mainly for the compressibility of the liquid (e.g., hydrocarbons are compressible) and cylinder material (according to Young's modulus). These can be accomplished via a computing device such as, for example, a flow computer 595. The precision bore cylinder 520 has a known volume, which can be verified with an industrial (or metrological) method such as a water draw procedure.

The piston 530 moves with the same velocity as the liquid between the two (or more) detectors 560 and the position sensor 550, and the time taken by the piston 530 to travel through the position sensor 550 provides a measure of flow rate. The piston 530 can be made of material that is appropriate for the prover operating pressure, temperature, and the desired resistance to degradation by the liquid that is being metered. The flow-through valve 540 can be located inside the piston 530 that permits fluid to flow through. The valve 540 is closed when the piston 530 moves from upstream to downstream position. The valve 540 is open when the piston 530 moves from down stream to the upstream position.

The piston 530 can be positioned and launched via an electromagnetic mechanism as further described herein. In a standby mode, the piston 530 is the downstream position with the valve 540 open. The electromagnetic drive mechanism pulls the piston 530 to the upstream position, the piston 530 is released, and the valve 540 closes to start a proving run.

The piston 530 will trip the detectors 560 as it travels the length of the calibrated section (precision bore cylinder) of the prover apparatus 500. Note that the detectors 560 can be optical, magnetic, laser, or other such sensors, electrical switches employed to start and stop counters and determine the calibrated section of the prover apparatus 500.

The liquid can be passed through the apparatus 500 until the temperature and pressure are stabilized. The temperature and pressure measurements can be made during the proving run by the temperature and pressure measurement devices 570. A processor or SVP (Small Volume Prover) controller 580 can be configured in association with the apparatus 500 for processing dual chronometry pulse interpolation. The SVP controller 580 can be a data processing system such as, for example, desktops, network devices, laptops, tablet computing devices, servers, and so forth.

The pulse interpolation is a pulse counting technique that can be employed to calculate the total number of meter pulses between the two detectors 560, including fractional pulses. The precision bore cylinder 520 is the measurement chamber of the apparatus 500. The piston 530 traveling at the same rate as the liquid trips the detectors 560 in order to signal "start" and "stop" as to the amount of liquid volume which then can be used to compare the indicated flow of the flow meter because the same amount of liquid volume flows through the flowmeter up or downstream of the piston during the test. The position sensor 550 verifies the detectors 560 at every run and provides calibration of flexible displaced volumes as the fluid travels downstream.

The position sensor also checks the correct return of the piston 530 after the flow stroke. The position sensor 550 also monitors a smooth operation of the prover apparatus 500 by detecting an interrupted batch with respect to the piston 530.

Such small volume prover apparatus 500 associated with the position sensor 550 can be employed for accurate variable volume calibration of a fluid flow sensor.

Note that a flow computer 595 can also be utilized in association with system 500. The flow computer 595 communicates with the SVP controller 580. The flow computer 595 can also communicate with, for example, the temperature and pressure sensor 570 and the optical detector(s) 560. Thus, signals from the optical detector(s) 560 can be provided to the external flow computer 595. Additionally, the measured pressure and temperature provided by the temperature and pressure sensor 570 can be processed by the flow computer 595. Calculations can be performed, for example, in accordance with API/ASTM methods utilized in industry. Flow computer 595 can be implemented in some embodiments as, for example, stand-alone or embedded flow proving computers.

The SVP controller 580 also communicates with the detector(s) 560 and receives signals from the detector(s) 560, and pressure and temperature data, along with the linear position input, and can then provide alternative outputs to the flow computer 595 with "emulated" start and stop signals (for other volumes), which control the motor (i.e., to start and stop for the next cycle). The SVP controller 580 can also monitor and diagnose correct function, etc., and provide status output data to the flow computer 595 such as, for example, data indicative "excessive vibration," "non-constant flow detected," "maintenance required," and the like.

The MIS 585 refers to a management information system that provides information for managing organizations effectively. An MIS usually involves three primary resources: technology, information, and people. Management information systems are regarded to be a subset of the overall internal controls procedures in a business, which cover the application of people, documents, technologies, and procedures used by, for example, management accountants to solve business problems such as costing a product, service, or a business-wide strategy. Management information systems are distinct from regular information systems in that they are used to analyze other information systems applied in operational activities in the organization. Academically, the term MIS is commonly used to refer to the group of information management methods tied to the automation or support of human decision making, e.g., decision support systems, expert systems, and Executive information systems.

Figure 1:
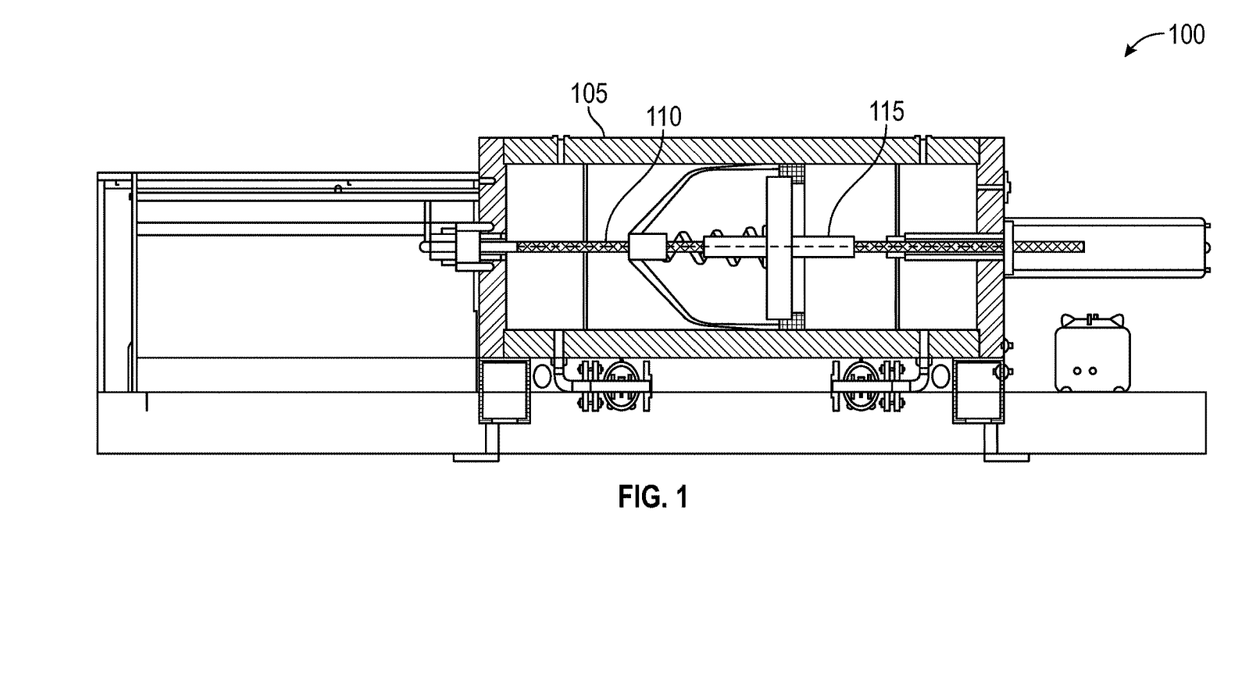
FIG. 1 illustrates a small volume prover apparatus, in accordance with an embodiment.

FIG. 1 illustrates a small volume prover apparatus 100 in accordance with an embodiment. The small volume prover apparatus 100 can function based on a simple electromagnetic operation with no hydraulics, mechanics, or pneumatics. The apparatus 100 provides a constant base volume. The design also ensures a low pressure drop in the metering system. The apparatus 100 can utilize an electronic pulse-counting technique such as, for example, a double chronometry operation for calibrating the displaced volume of a fluid passed through a flowmeter.

The apparatus 100 generally includes a precision bore cylinder 105 (e.g., a flow tube) having a flow inlet and a flow outlet. The precision bore cylinder 105 can maintain and house a piston configured with a flow-through valve arrangement in order to permit fluid to pass through an annular passage when the piston travels from one position to an opposite position. The piston is driven by a hollow shaft with coils 110 and a hub 115 with magnets configured therein. Note that the piston is preferably a low-drag piston. Note also that in some embodiments the precision bore cylinder 105 may form a part of a pipeline or can be provided in the shape of a pipe. The precision bore cylinder 105 has a known displaced volume, which can be calibrated utilizing a water draw procedure or other metrological accepted method. The precision bore cylinder 105 can function as the measurement chamber of the apparatus 100.

Generally, a sensor can be used for continuously detecting the velocity of the piston, for example, by integrating the acceleration of the piston as it moves between the two positions (e.g., a first position and successive positions, a start position, and an end position, etc.).

Figure 2:
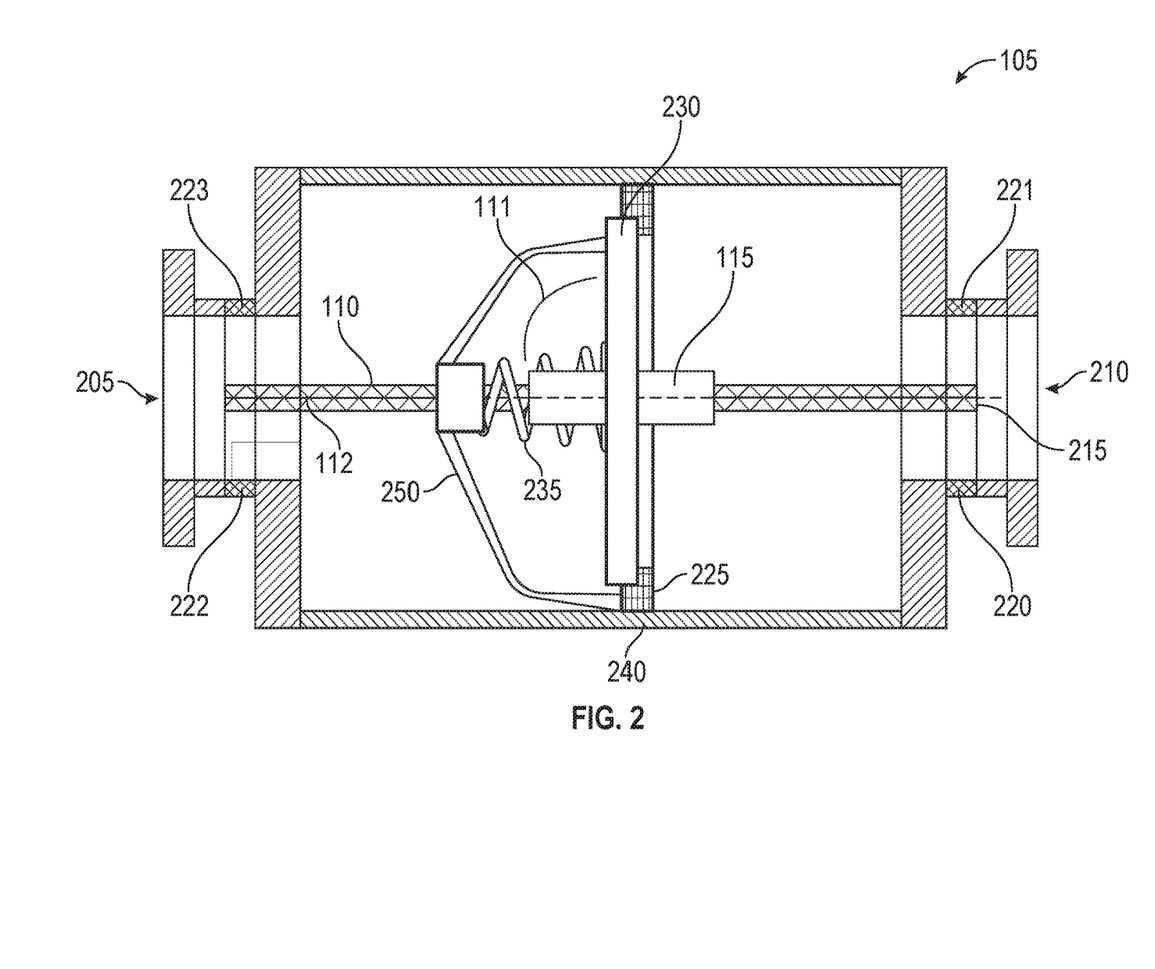
FIG. 2 illustrates a small volume prover bore cylinder, in accordance with another embodiment.

FIG. 2 illustrates a diagram of the apparatus 100, in accordance with another embodiment. The precision cylinder 105 can include inlet 205 and outlet 210. The hollow shaft with coils 110 can be embodied as a solenoid toroid. A spring 235 can be fitted around solenoid toroid 110. The spring 235 closes the poppet valve during a calibration pass.

The poppet valve (or flow through valve) 230 is connected to the hub 115 which is spring loaded and housed in the piston 225 via the strut 250 forming the complete moving piston assembly. The piston 225 runs perpendicular to the shaft 110. It should be understood that in an embodiment, the shaft 110 is fixed and provides the structure along which the hub 115 is driven. In some embodiments, the solenoid toroid is provided power from power supply 215.

Power supply 215 can provide power to the coils in the shaft in order to drive the hub/valve/piston assembly. The shaft 110 is supported by the support 220, support 221, support 222, and support 223. The support 220 and 221 can be embodied as a ring with spokes and a hub. Similarly, supports 222/223 can be embodied as a ring with spokes and a hub on the upstream side of the shaft 110.

Figure 3:
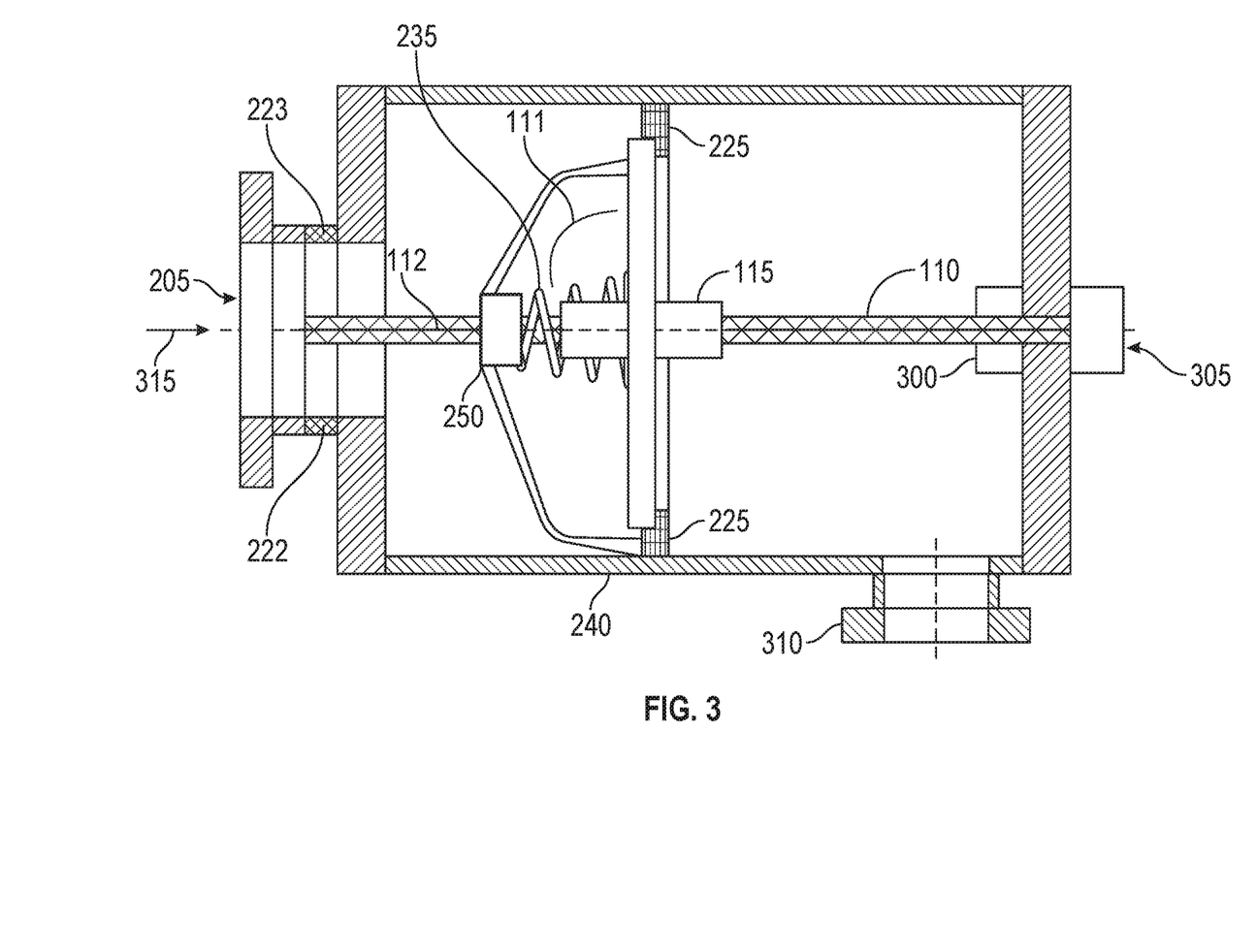
FIG. 3 illustrates an alternative small volume prover bore cylinder, in accordance with the disclosed embodiments.

FIG. 3 illustrates a diagram of apparatus 100, in accordance with yet another embodiment. In this embodiment, the precision cylinder includes flow inlet 205 for a fluid flow illustrated by arrow 315. Flow outlet 310 is formed on the sidewall 240 of precision cylinder 105.

In this embodiment, an optional shock absorber 300 is provided at the second position of the flow tube 240. A junction box 305 can be provided on the exterior of the precision cylinder 105 which serves to provide power for the solenoid toroid 110. It should be understood that the power may be supplied by any commensurate power supply depending on design considerations.

In general, the small volume prover disclosed herein can have a stand-by mode. In stand by mode, the piston 225 is downstream and stationary. The inner flow through valve is open (slightly upstream of the main piston body), allowing product (i.e., a test fluid) to flow freely through the provers measurement cylinder without significant pressure loss.

At the commencement of a proving run, a proving computer can signal the SVP Controller to engage the linear drive motor. This entails providing a charge to the coils or magnets via power source 215. The piston assembly is thus drawn to the upstream start position. The low-drag piston can then be released by the linear driven return mechanism allowing it to freely travel downstream with the fluid.

As the piston is released, the flow-through valve closes with assistance of a tension spring, allowing the piston velocity to be synchronized with the test fluid velocity as it travels through the smooth-bore section of the prover body. This has a minimal effect on the flow stream.

The travel time between the upstream and downstream position of the piston is measured. This measurement is preferably taken using two precision detectors mounted externally on a switch bar above the piston drive shaft. The detectors can be optical, magnetic, infrared, laser, or other such detectors. However, alternative means for measuring the time interval are also possible.

In an embodiment, the first detector is actuated by a sensor attached to the external piston shaft a short run after it is released, indicating the start of the timing sequence to a computer. The second sensor is located a distance downstream on the switch bar, allowing the detector to be actuated during the piston travel indicating the end of the proving cycle. In other embodiments, this is accomplished with the detection mechanism itself (i.e., magnetic, magnetostrictive, or other such detection approach). At the same time the controller sends the signal to the proving computer to stop the timing sequence.

After passing the end volume switch, the piston shaft is stopped by an electro-magnetic stop. The stop may alternatively be embodied as a mechanical or a hydraulic stop. Product flow continues to push the perimeter of the piston further downstream, opening the flow through valve; allowing continued flow with minimal disturbance to the process condition.

Figure 4:
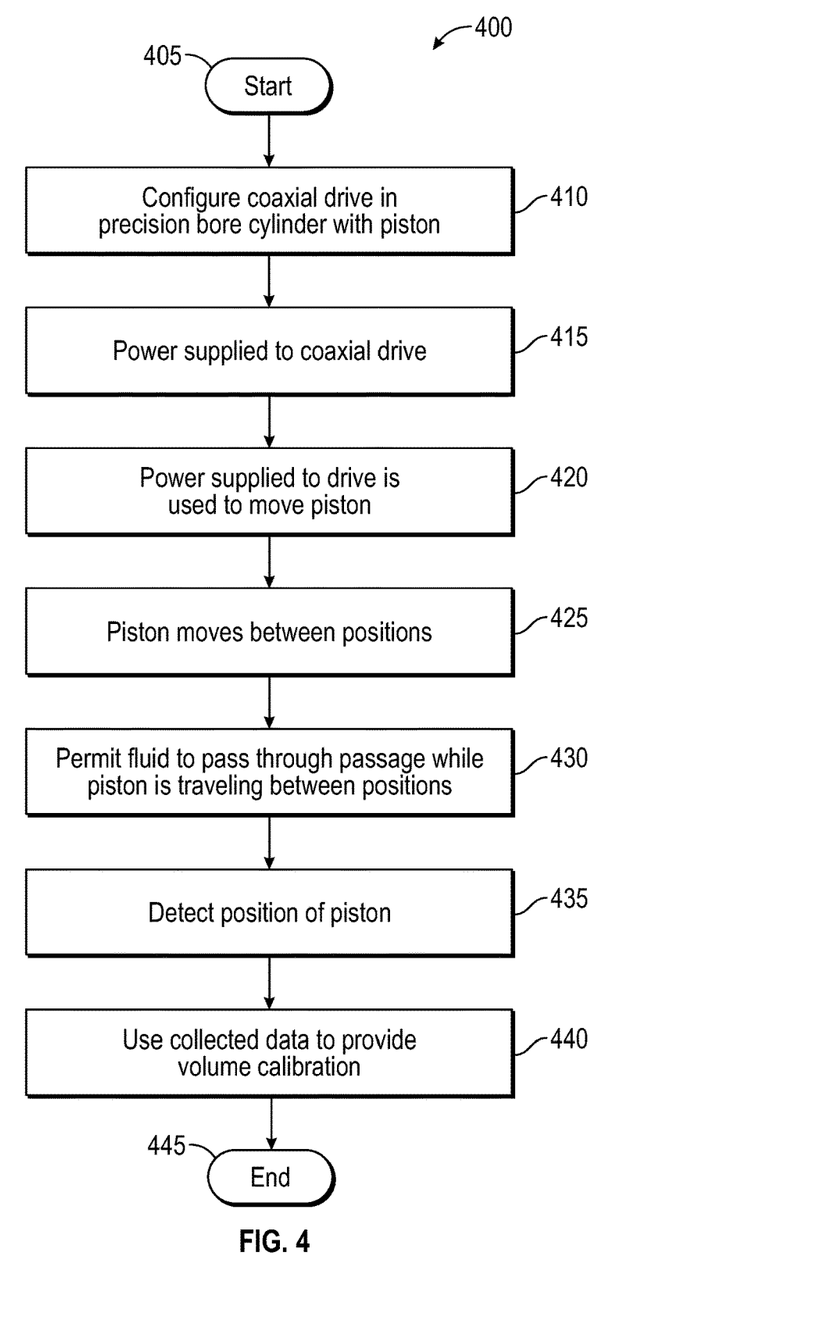
FIG. 4 illustrates a high level flow chart of operational steps of a method for providing variable volume calibration, in accordance with the disclosed embodiments.

FIG. 4 illustrates a high level flow chart illustrating logical operational steps associated with a method 400 for volume calibration according to the embodiments disclosed herein. The method begins at step 405.

At step 410, the coaxial drive can be configured in the precision bore cylinder with the piston. Power is supplied to the coaxial drive as shown at step 415 so that the drive can move the piston from one position to another as shown at step 420. The piston accordingly moves from one position to another as shown at step 425.

Step 430 shows that fluid can be permitted to pass through the annular passage as the piston is traveling from one position to an opposite position. The sensors disclosed herein can be used to detect the position of the piston at all times, as shown by step 435. This information can be used to provide accurate variable volume calibration as illustrated at step 440. The method ends at step 445.

The embodiments disclosed herein thus describe a drive mechanism that can provide a retraction device, position and velocity sensor, and stop mechanism at the end of the stroke. The embodiments described herein provide a significant reduction of necessary parts, seals, and built volume as compared to prior art provers.

Based on the foregoing, it can be appreciated that a number of embodiments are disclosed herein, preferred and alternative. For example, in one embodiment, a small volume prover apparatus comprises a bore cylinder having a flow inlet and a flow outlet; a piston maintained by and housed within the bore cylinder; a magnetized forcer connected to the piston; and a magnetic drive chamber configured to produce linear motion of the magnetized forcer.

In an embodiment, the magnetized forcer comprises a magnet sleeve connected to a poppet valve. The magnetic drive chamber comprises: a rod, a plurality of coils formed around the rod, and a power supply configured to supply power to the plurality of coils.

In another embodiment of the small volume prover apparatus, the magnetized forcer comprises a plurality of coils formed in a sleeve connected to a poppet valve; and a power supply configured to supply power to the plurality of coils. The magnetic drive chamber comprises: a rod and a plurality of magnets formed in the rod.

In another embodiment, the apparatus further comprises a support for the magnetic drive chamber and a spring formed around the forcer, configured to synchronize the piston velocity to the test fluid flowing through the prover apparatus.

In yet another embodiment, a system comprises a bore cylinder having a flow inlet and a flow outlet; a piston maintained by and housed within the bore cylinder; a magnetized forcer connected to the piston; and a magnetic drive chamber configured to produce linear motion of the magnetized forcer.

In an embodiment, the magnetized forcer 111 comprises a magnet sleeve connected to a poppet valve. The magnetic drive chamber comprises: a rod 112, a plurality of coils formed around the rod, and a power supply configured to supply power to the plurality of coils.

In another embodiment, the magnetized forcer comprises a plurality of coils formed in a sleeve connected to a poppet valve and a power supply configured to supply power to the plurality of coils. The magnetic drive chamber comprises a rod and a plurality of magnets formed in the rod.

In an embodiment, the system further comprises a support for the magnetic drive chamber and a spring formed around the forcer, configured to synchronize the piston velocity to a the test fluid flowing through the prover apparatus.

In yet another embodiment, a method comprises passing a fluid through a bore cylinder that houses a piston having a valve; driving the piston from a first position to a second position with a magnetized forcer connected to the piston and a magnetic drive chamber configured to produce linear motion of the magnetized forcer; sensing a position and movement of the piston by a linear displacement sensor operably connected to the piston; and providing a variable volume calibration.

In an embodiment, the method further comprises measuring pressure and temperature within the bore cylinder utilizing a pair of temperature and pressure measurement devices.

In an embodiment, providing a variable volume calibration further comprises calibrating the fluid flow utilizing a double chronometry.

In an embodiment, the magnetized forcer comprises a magnet sleeve connected to a poppet valve and the magnetic drive chamber comprises a rod; a plurality of coils formed around the rod; and a power supply configured to supply power to the plurality of coils.

In another embodiment of the method, the magnetized forcer comprises a plurality of coils formed in a sleeve connected to a poppet valve and a power supply configured to supply power to the plurality of coils. The magnetic drive chamber comprises a rod and a plurality of magnets formed in the rod.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

What is claimed is:
1. A small volume prover apparatus, comprising:
a bore cylinder having a flow inlet and a flow outlet;
a piston maintained by and housed within said bore cylinder;
a magnetized forcer connected to said piston;
a magnetic drive chamber configured to produce linear motion of said magnetized forcer; and
a spring formed around said forcer configured to synchronize said piston velocity to the test fluid flowing through said prover apparatus.

2. The small volume prover apparatus of claim 1 wherein said magnetized forcer comprises:
a magnet sleeve connected to a poppet valve.

3. The small volume prover apparatus of claim 2 wherein said magnetic drive chamber comprises:
a rod;
a plurality of coils formed around said rod; and
a power supply configured to supply power to said plurality of coils.

4. The small volume prover apparatus of claim 1 wherein said magnetized forcer comprises:
a plurality of coils formed in a sleeve connected to a poppet valve; and
a power supply configured to supply power to said plurality of coils.

5. The small volume prover apparatus of claim 4 wherein said magnetic drive chamber comprises:
a rod; and
a plurality of magnets formed in said rod.

6. The small volume prover apparatus of claim 1 further comprising:
a support for said magnetic drive chamber.

7. A system comprising:
a bore cylinder having a flow inlet and a flow outlet;
a piston maintained by and housed within said bore cylinder;
a magnetized forcer connected to said piston;
a magnetic drive chamber configured to produce linear motion of said magnetized forcer; and
a spring formed around said magnetized forcer configured to synchronize said piston velocity to the test fluid flowing through said prover apparatus.

8. The system of claim 7 wherein said magnetized forcer comprises:
a magnet sleeve connected to a poppet valve.

9. The system of claim 8 wherein said magnetic drive chamber comprises:
a rod;
a plurality of coils formed around said rod; and
a power supply configured to supply power to said plurality of coils.

10. The system of claim 7 wherein said magnetized forcer comprises:
a plurality of coils formed in a sleeve connected to a poppet valve; and
a power supply configured to supply power to said plurality of coils.

11. The system of claim 10 wherein said magnetic drive chamber comprises:
a rod; and
a plurality of magnets formed in said rod.

12. The system of claim 7 further comprising:
a support for said magnetic drive chamber.

13. A method, comprising:
passing a fluid through an annular passage associated with a bore cylinder that houses a piston having a valve;
driving said piston from a first position to a second position with a magnetized forcer connected to said piston and a magnetic drive chamber configured to produce linear motion of said magnetized forcer wherein a spring formed around said magnetized forcer synchronizes said piston velocity to the test fluid flowing through said prover apparatus;
sensing a position and movement of said piston by a linear displacement sensor operably connected to said piston; and
providing a variable volume calibration.

14. The method of claim 13 further comprising:
measuring pressure and temperature within said bore cylinder utilizing a pair of temperature and pressure measurement devices.

15. The method of claim 13 wherein providing a variable volume calibration further comprises:
calibrating said fluid flow utilizing a double chronometry.

16. The method of claim 13 wherein said magnetized forcer comprises:
a magnet sleeve connected to a poppet valve; and
said magnetic drive chamber comprises:
a rod;
a plurality of coils formed around said rod; and
a power supply configured to supply power to said plurality of coils.

17. The method of claim 13 wherein said magnetized forcer comprises:
a plurality of coils formed in a sleeve connected to a poppet valve; and
a power supply configured to supply power to said plurality of coils.

18. The method of claim 17 wherein said magnetic drive chamber comprises:
a rod; and
a plurality of magnets formed in said rod.

* * * * *